(12) United States Patent
Kawahara et al.

(10) Patent No.: US 6,833,089 B1
(45) Date of Patent: Dec. 21, 2004

(54) ARTICLE HAVING PHOTOCATALYTIC ACTIVITY

(75) Inventors: Tetsuro Kawahara, Osaka (JP); Kazuhiro Doushita, Osaka (JP); Hiroyuki Inomata, Osaka (JP); Etsuo Ogino, Osaka (JP); Kenji Mori, Osaka (JP); Yoshifumi Kijima, Osaka (JP); Hiroaki Tada, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 42 days.

(21) Appl. No.: 09/630,777

(22) Filed: Aug. 2, 2000

(30) Foreign Application Priority Data

Aug. 5, 1999 (JP) .......................................... P11-222548

(51) Int. Cl.[7] .......................... B32B 7/02; B32B 17/06; B32B 19/00; H01B 1/08; H01B 1/02
(52) U.S. Cl. ............................... 252/520.2; 252/518.1; 428/212; 428/213; 428/426; 428/702; 428/704; 502/236; 502/240; 502/242
(58) Field of Search ................................ 428/212, 426, 428/702, 704, 213; 430/531; 252/520.2, 518.1; 502/236, 240, 242

(56) References Cited

U.S. PATENT DOCUMENTS

| | | | | |
|---|---|---|---|---|
| 5,547,823 A | * | 8/1996 | Murasawa et al. | 430/531 |
| 6,228,480 B1 | * | 5/2001 | Kimura et al. | 428/328 |
| 6,379,776 B1 | * | 4/2002 | Tada et al. | 428/149 |
| 6,576,344 B1 | * | 6/2003 | Doushita et al. | 428/426 |
| 6,582,839 B1 | * | 6/2003 | Yamamoto et al. | 428/702 |

FOREIGN PATENT DOCUMENTS

| | | |
|---|---|---|
| EP | 0 728 712 A1 | 8/1996 |
| EP | 0 820 967 A1 | 1/1998 |
| EP | 0 901 991 A2 | 3/1999 |
| JP | 9-071437 A | 3/1997 |
| JP | 10-231146 A | 9/1998 |
| JP | 10-330131 A | 12/1998 |
| JP | 11-010006 A | 1/1999 |
| JP | 11-079788 A | 3/1999 |
| JP | 2000-014755 A | 1/2000 |
| JP | 2000-094569 A | 4/2000 |

OTHER PUBLICATIONS

Patent Abstracts of Japan (JP–60–118239).
XP 002151982 (1998).
European Search Report.

* cited by examiner

Primary Examiner—B. Hamilton Hess
Assistant Examiner—L. Ferguson
(74) Attorney, Agent, or Firm—Sughrue Mion, PLLC

(57) ABSTRACT

A surface of a glass plate is coated with a first n-type semiconductor film which is a 50 nm-thick niobium oxide film as a primer layer. The primer layer is coated with a 250 nm-thick photocatalyst film comprising titanium oxide. Thus, an article having a photocatalytically active surface is obtained. The two coating films can be formed by sputtering. The first n-type semiconductor film as the primer layer is selected so as to have a larger energy band gap than the titanium oxide. Due to this constitution, more holes are generated near the film surface. This article can be free from the problem of conventional titanium oxide films having photocatalytic activity that it is difficult to generate many surface holes contributing to photocatalytic activity, because electrons and holes generated by charge separation recombine within the film, making it impossible to effectively heighten catalytic activity.

9 Claims, 2 Drawing Sheets

ARTICLE HAVING PHOTOCATALYTIC ACTIVITY

FIELD OF THE INVENTION

The present invention relates to a substrate coated with a photocatalyst film. More particularly, the invention relates to a substrate having functions such as stain resistance, fog resistance and easy wash property.

BACKGROUND OF THE INVENTION

Attempts are being made to apply to various articles a technique for environmental clarification in which a thin film of titanium oxide functioning as a photocatalyst is used to decompose harmful substances and a technique for obtaining stain resistance by using the titanium oxide film to decompose organic fouling substances and simultaneously make the surface hydrophilic. In these techniques, it is crucially important for the titanium oxide film to have enhanced photocatalytic activity so as to have practical functions.

Various methods for enhancing photocatalytic activity have been attempted. Examples thereof include a technique in which a titanium oxide film having satisfactory anatase crystallinity is formed, a technique in which a porous or granular titanium oxide film is formed so that the film has an increased surface area, and a technique in which a titanium oxide film is formed which has catalytic activity having enhanced sensitivity not only to ultraviolet but to visible light.

A technique for enhancing photocatalytic activity is being attempted, in which the charge separation of the electrons and holes which have been excited by light irradiation in a titanium oxide film is accelerated and the chance of recombination is reduced. JP-A-63-100042 (the term "JP-A" as used herein means an "unexamined published Japanese patent application") discloses the addition of platinum, rhodium or palladium to titanium oxide for the acceleration of charge separation in a titanium oxide film.

An attempt is being made to heighten the photocatalytic functions of a titanium oxide film by adding other elements to the film and thereby attaining valence control and enhancing photoadsorption/photodesorption function. JP-A-10-666879 discloses a technique in which nickel, copper, tin or the like is added to a titanium oxide film to thereby heighten photocatalytic functions, and Japanese Patent Application No. 10-279058 discloses a technique of heightening photocatalytic functions by adding a metal such as magnesium, vanadium, chromium, manganese or molybdenum.

Furthermore, an article having a multilayered photocatalyst film comprising two or more layers superposed in decreasing order of energy band gap (hereinafter referred to as "band gap"), which influences the relationship between photocatalytic activity and incident light, from the incident-light side is disclosed in, e.g., JP-A-60-118239 and JP-A-62-68547. JP-A-11-10006 discloses a multilayered photocatalyst film constitution which contains a conductive interlayer of tin oxide formed between a substrate and a photocatalyst film.

However, of the conventional techniques described above, the photocatalyst film which is an even titanium oxide film containing a metal such as a noble metal has the following drawbacks. Charge separation (generation of electron-hole pairs) occurs at the interface between the titanium oxide film as a matrix and the metal. However, when the inner structure of the film is viewed microscopically, there is a high probability that charge pairs recombine before they reach the film surface to effectively perform their photocatalytic functions. Moreover, electron-hole recombination on the titanium oxide film surface is not inhibited. Consequently, this conventional technique has a problem that the attainable photocatalytic activity is not so high.

The photocatalyst film comprising thin semiconductor films superposed in decreasing order of band gap from the incident-light side, in the conventional techniques described above, has an advantage that it causes charge separation in a wider range of incident-light wavelengths and thereby generates more electron-hole pairs. However, this photocatalyst film has a problem that it is difficult to inhibit the electron-hole pairs from recombining in the photocatalyst film and photocatalytic activity cannot always be enhanced effectively.

Furthermore, with respect to the multilayered photocatalyst film constitution containing a conductive interlayer of tin oxide formed between a substrate and a photocatalyst film, in the conventional techniques described above, there is a description in the reference to the effect that the photocatalyst film retains a low charge density and comes to have an increased charge density upon irradiation with intense light, whereby the probability of recombination in the energy band present on the catalyst film surface can be kept low to thereby improve photocatalytic activity. However, this multilayered constitution has a problem that it is necessary to increase addition amount or film thickness for obtaining a certain degree of conductivity, resulting in an increased cost.

SUMMARY OF THE INVENTION

Accordingly, an object of the present invention is to provide an article having photocatalytic activity which comprises a substrate, a first n-type semiconductor film as a primer layer formed over a surface of the substrate, and a photocatalyst film made of an n-type semiconductor and formed on the primer layer, wherein the first n-type semiconductor film as the primer layer has an energy band gap larger than that of the photocatalyst film.

When a photocatalyst film is irradiated with ultraviolet ray, electron-hole pairs generate in the film. Of those electron-hole pairs, ones which are present on or have moved to the film surface contribute to photocatalyticactivity. However, when the electron-hole pairs which have generated recombine in an inner part of the film, they no longer contribute to photocatalytic activity. In the present invention, since the photocatalyst film has n-type semiconductive properties, the film has an inflected energy level band structure near the film surface and, because of this, holes are sent preferentially to the surface.

If the thickness of a photocatalyst film is increased in order to enhance catalytic activity, this results in increased chances of electron/hole recombination in inner parts of the film and the band inflection near the film surface becomes relatively small. Because of this, it is difficult to effectively enhance photocatalytic activity by increasing the film thickness beyond a certain level.

In the present invention, an n-type semiconductor film is employed as a photocatalyst film and is bonded to a primer layer which is an n-type semiconductor film having a band gap larger than that of the photocatalyst film. In the multilayer structure of the present invention, the band structure is inflected so that the two films have the same Fermi level. Furthermore, the Fermi level in the photocatalyst film and that in the n-type semiconductor film as a primer layer are located just below the conduction band. Since the band gap in the primer layer is larger than that in the photocatalyst film, the upper edge of the valence band in the primer layer is located below the upper edge of the valence band in the photocatalyst film. Because of this, the holes generated in the photocatalyst film according to the present invention travel so as to recede from the primer film, i.e., travel toward the surface of the photocatalyst film.

In the photocatalyst film according to the present invention, since holes travel preferentially to the film surface, the proportion of holes which recombine with electrons in an inner part of the film and thus disappear without contributing to photocatalytic functions can be reduced for the reasons described above. Consequently, photocatalytic functions can be improved effectively according to the film thickness.

The photocatalytic functions in the present invention are mainly attributable to the presence of holes near the surface of the photocatalyst film. The film is hence highly active in oxidation reactions. For example, the photocatalyst film has been improved so as to have practically useful effects on, e.g., the decomposition of formaldehyde, decomposition of volatile organic compounds (VOC) causative of offensive odors, and decomposition of organic fouling substances which impair the hydrophilicity of glass surfaces.

Figure 1:
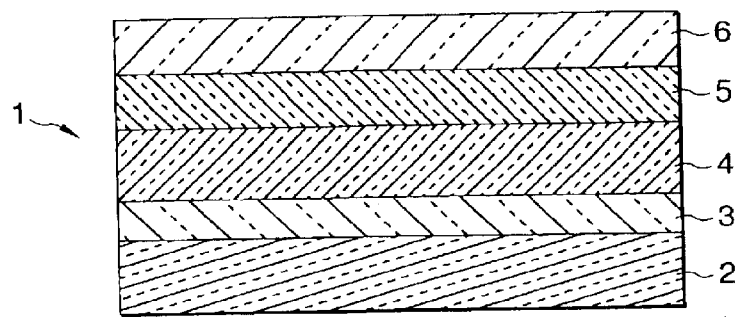
FIG. 1 is a sectional view of one embodiment of the article having photocatalytic activity according to the present invention.

In the drawings, the reference numerals are as follows.

1: Article of the present invention
2: Glass plate
3: Alkali dissolution preventive film of silicon dioxide
4: Primer layer
5: Titanium oxide photocatalyst film
6: Hydrophilic film

DETAILED DESCRIPTION OF THE INVENTION

It is preferred in the present invention that the photocatalyst film be constituted of either an oxide semiconductor film made of titanium oxide ($TiO_2$) (band gap: 3.0 eV in rutile, 3.2 eV in anatase) or an oxide semiconductor film containing titanium oxide as the main component, from the standpoint of enabling the film to have high photocatalytic activity. Preferred examples of the photocatalyst film other than such titanium oxide films include a film of strontium titanate ($SrTiO_3$; band gap, 3.2 eV).

Besides being a titanium oxide film, the photocatalyst film may be one comprising fine titanium oxide particles dispersed in, e.g., a film of silicon dioxide.

The primer layer used in the present invention is preferably constituted of an oxide semiconductor film comprising at least one metal oxide selected from the group consisting of niobium oxide ($Nb_2O_5$: 3.4 eV), tin oxide ($SnO_2$: 3.5 eV), aluminum oxide ($Al_2O_3$:>5 eV), zinc oxide ($ZnO$: 3.3 eV) and zirconium oxide ($ZrO_2$: 5.0 eV).

The thickness of the primer layer is preferably 5 nm or larger. This is because thickness thereof smaller than 5 nm results in insufficient bonding to the photocatalyst film due to a tunneling effect and hence in insufficient supply of holes to the surface of the photocatalyst film.

The thickness of the photocatalyst film is preferably 30 nm or larger, more preferably 50 nm or larger. This is because thickness thereof smaller than 30 nm results in insufficient light absorption. On the other hand, the upper limit of the thickness of the photocatalyst film is preferably 2,000 nm. This is because thickness thereof exceeding 2,000 nm results in relatively reduced bonding to the primer layer and hence in insufficient effect of the deposition of the primer layer. From these standpoints, the thickness of the photocatalyst film is preferably 1,000 nm or smaller.

DESCRIPTION OF THE PREFERRED EMBODIMENTS

Embodiments of the present invention will be explained in detail below by reference to Examples and Comparative Examples.

FIG. 1 is a sectional view of one embodiment of the article having photocatalytic activity according to the present invention. This article 1 having photocatalytic activity comprises a glass plate 2 as a substrate and, superposed on a surface thereof, a silicon dioxide film 3 as an alkali dissolution preventive film, an n-type semiconductor film 4 as a primer layer, a photocatalyst film 5, and a silicon dioxide film 6 as a hydrophilic film. The primer layer 4 and the photocatalyst film 5 are essential films, while the alkali dissolution preventive film 3 and the hydrophilic film 6 are optional films.

Figure 2:
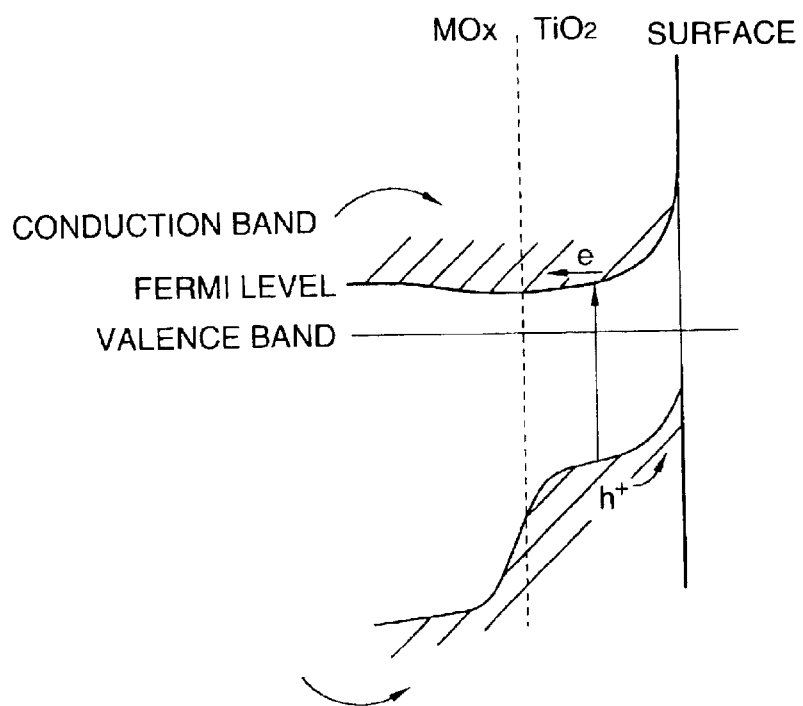
FIG. 2 is an illustration showing an energy band structure possessed by a multilayer structure according to the present invention comprising a primer layer and a titanium oxide photocatalyst film.

FIG. 2 is an illustration showing an energy band structure possessed by a multilayer structure according to the present invention comprising a primer layer (metal oxide; indicated by $MO_x$) and a titanium oxide photocatalyst film ($TiO_2$).

Figure 3:
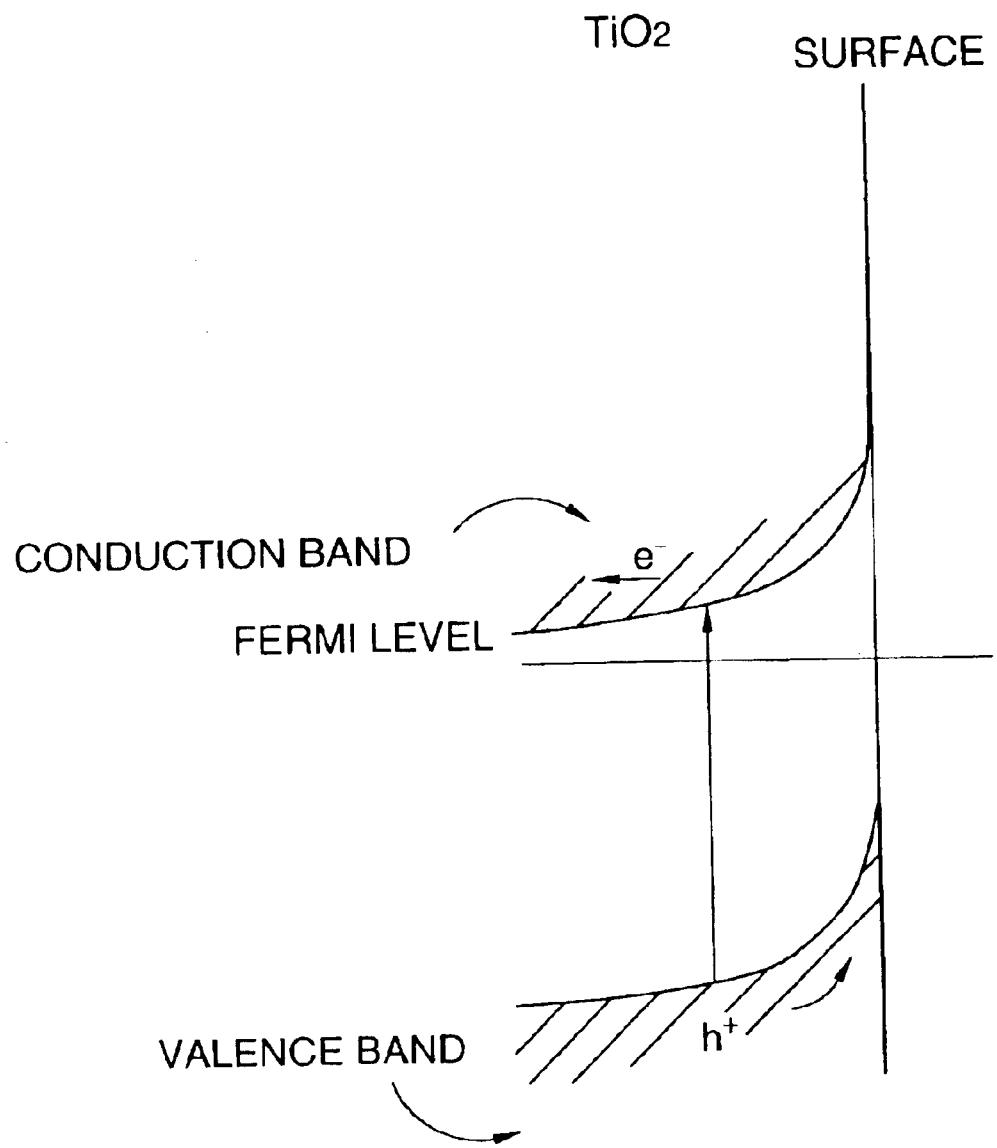
FIG. 3 is an illustration showing an energy band structure near the surface of a conventional photocatalyst film composed of a titanium oxide single layer and formed on a surface of a substrate.

FIG. 3 is an illustration showing an energy band structure near the surface of a conventional photocatalyst film composed of a titanium oxide single layer and deposited on a surface of a substrate.

As shown in FIG. 2, the energy level of the valence band changes at the interface between the n-type semiconductor as the primer layer and the titanium oxide photocatalyst film, and the curve of energy level for the valence band is inflected so that the surface of the photocatalyst film has an elevated energy level. On the other hand, since the primer layer is constituted of an n-type semiconductor film and bonded to the photocatalyst film, the lower edge of the conduction band in an inner part of the film has a slightly higher energy than the Fermi level and the curve of energy level for the conduction band is inflected so that the energy becomes high in a region near the photocatalyst film surface as the position becomes closer to the photocatalyst film surface.

The article of the present invention has the above-described inflections in energy level curve respectively at the interface between the primer layer and the photocatalyst film and near the photocatalyst film surface. Consequently, the article of the present invention is characterized by the behaviors of holes and electrons in the film depth direction. Namely, the energy-level holes $h^+$ present in the valence band are apt to travel toward the photocatalyst film surface, while the energy-level electrons $e^-$ present in the conduction band are apt to travel toward an inner part of the photocatalyst film.

Because of this, the holes which have been generated by charge separation are apt to travel toward the surface of the photocatalyst film as shown in FIG. 2. The article of the present invention is prevented from suffering the phenomenon in which electrons recombine with holes inside the film to result in charge disappearance and to come not to contribute to photocatalytic activity, as compared with the case shown in FIG. 3, wherein a single-layer photocatalyst film is formed.

The substrate used in the present invention is not particularly limited. Optically, the substrate may be transparent or opaque. Usable examples of the material of the substrate include metals, ceramics, glasses and plastics.

When a transparent silicate glass plate, e.g., a glass plate manufactured by the float process, is used as the substrate, a window glass having stain resistance can be obtained.

Many silicate glasses usually contain an alkali component such as sodium or potassium so as to secure meltability, moldability into plate, etc. In the case of using a glass plate containing an alkali component, it is preferred to interpose an alkali diffusion preventive film between the glass plate and the primer layer to thereby prevent the alkali component from diffusing into the photocatalyst film. Examples of this alkali diffusion preventive film include a silicon dioxide film, silicon nitride film and silicon oxynitride film. Films of other metal oxides are also usable.

The metal oxide film made of niobium oxide, tin oxide, aluminum oxide, zinc oxide or zirconium oxide, which is preferred for use as the primer layer in the present invention, in itself has the ability to prevent alkali dissolution.

The deposition of an alkali dissolution preventive film is effective in preventing an alkali component from diffusing, upon substrate heating in photocatalyst film formation, into the photocatalyst film to impair the crystallinity of the photocatalyst film or disorder the electron structure thereof. Thus, photocatalytic activity can be more effectively prevented from decreasing.

In the present invention, a hydrophilic film can be formed on the surface of the photocatalyst film. By the formation of the hydrophilic film, enhanced hydrophilicity can be imparted to the surface of the photocatalyst film. This hydrophilic film preferably has a thickness so as not to impair photocatalytic activity. From this standpoint, the thickness thereof is generally 20 nm or smaller, preferably 10 nm or smaller, more preferably 5 nm or smaller. The hydrophilic film may be formed so as to cover all or part of the photocatalyst film. The hydrophilic film is not particularly limited in material as long as it is hydrophilic, and preferred examples thereof include films of silicon oxide, aluminum oxide, cerium oxide and zirconium oxide.

In order to enhance photocatalytic activity and hydrophilicity, the article may be made to have surface roughness by forming any of the primer layer, photocatalyst film, and hydrophilic film so as to have a roughened surface.

In Examples 1 to 5, a primer layer and a photocatalyst film were formed by magnetron sputtering. Common formation conditions are shown below. The methods used for evaluating the photocatalyst films obtained are shown below.

Formation Conditions

Glass plate: Soda-lime silicate glass plate (15 cm×15 cm; thickness, 2 mm)

Glass plate temperature during layer and film formation: 350° C.

Target: Metal target having dimensions of 25 cm×38 cm×6 mm (In forming niobium oxide primer film, niobium metal was used as target.)

Power: 3 kw from direct-current power source

Sputtering gas atmosphere: Reactive sputtering in an atmosphere maintained at 0.4 Pa by introducing oxygen gas Evaluation Methods Triolein-decomposing activity:

The surface of the film was coated with 2.5 g of triolein (coating area: 25 cm$^2$), and the coated surface was irradiated with black light (ultraviolet ray) at an intensity of 3 mW/cm$^2$ for 40 hours. The amount of the applied triolein which remained undecomposed on the film surface was measured to determine the residual amount thereof (wt %).

Contact angle: The film surface was irradiated with black light (ultraviolet) at an intensity of 3 mW/cm$^2$ for 1 hour. Immediately thereafter, the contact angle with pure water was measured with a waterdrop contact angle meter.

Antifouling performance: Relative evaluation was conducted with respect to fouled state resulting from 2-month outdoor exposure ⊚: Obviously less fouled than a glass (having no photocatalyst film) exposed simultaneously ○: Less fouled, under some conditions such as southward exposure, than a glass (having no photocatalyst film) exposed simultaneously ×: Almost equal in fouling to a glass (having no photocatalyst film) exposed simultaneously, and no difference was observed therebetween

EXAMPLE 1

A soda-lime silicate glass plate was sufficiently cleaned, heated to 350° C., and then coated on one side with a primer layer of niobium oxide in a thickness of 50 nm. The primer layer was formed by reactive sputtering using niobium metal as a target while introducing oxygen gas into the film formation chamber at a rate of 50 sccm. The surface of this primer layer was coated with a photocatalyst film of titanium oxide in a thickness of 250 nm. The titanium oxide film was formed by reactive sputtering using titanium metal as a target while introducing an argon/oxygen mixed gas at a rate of 50 sccm. Thus, Sample 1 was obtained as an example of the article of the present invention having a photocatalyst film coating. Sample 1 was evaluated for the performances, and the results obtained are shown in Table 1. The samples shown in Table 1, when analyzed by the X-ray diffraction method, each showed a peak attributable to anatase crystals, and no difference in crystallinity was observed among these.

Samples 2 to 5 were obtained using different primer layer materials, and the evaluation results there for are shown in Table 1.

Table 1 shows that the formation of the primer layers results in decreases in triolein residual amount, which indicates triolein-decomposing ability, and hence in enhanced photocatalytic activity. It can be said that the enhanced photocatalytic activity increases the hydrophilicity of the film surface and imparts antifouling performance. The results for Samples 1 to 5 show that use of niobium oxide, aluminum oxide or zinc oxide as a primer layer results in higher photocatalytic activity of the photocatalyst film and hence in better antifouling properties. It was found that the most preferred primer materials among those are niobium oxide and aluminum oxide from the standpoint of imparting such performances.

TABLE 1

| Sample No. | Multilayer structure Primer layer Ingredient | Multilayer structure Primer layer Thickness (nm) | Titanium oxide photocatalyst film Thickness (nm) | Triolein-decomposing activity (residual amount, %) | Contact angle with water (degree) | Antifouling performance |
|---|---|---|---|---|---|---|
| (Example) | | | | | | |
| Sample 1 | $Nb_2O_5$ | 50 | 250 | 0 | 9 | ◉ |
| Sample 2 | $Al_2O_3$ | 50 | 250 | 0 | 10 | ◉ |
| Sample 3 | $SnO_2$ | 50 | 250 | 58 | 18 | ○ |
| Sample 4 | $ZrO_2$ | 50 | 250 | 54 | 18 | ○ |
| Sample 5 | ZnO | 50 | 250 | 35 | 14 | ◉ |
| (Comparative Example) | | | | | | |
| Comparative Sample 1 | None | | 250 | 74 | 25 | X |

COMPARATIVE EXAMPLE 1

A photocatalyst film of titanium oxide was formed on a glass plate in the same manner as in Example 1, except that the primer layer was omitted. Thus, Comparative Sample 1 was produced. The film was tested, and the results obtained are shown in Table 1 above.

EXAMPLE 2

The same procedure as in Example 1 was conducted, except that a niobium oxide film was formed as a primer layer in different thicknesses. Thus, Samples 6 to 8 were produced to examine the influence of primer layer thickness on catalytic activity. The evaluation results for the films are shown in Table 2.

TABLE 2

| Sample No. | Multilayer structure Primer layer Ingredient | Multilayer structure Primer layer Thickness (nm) | Titanium oxide photocatalyst film, Thickness (nm) | Triolein-decomposing activity (residual amount, %) | Contact angle with water (degree) | Antifouling performance |
|---|---|---|---|---|---|---|
| (Example) | | | | | | |
| Sample 6 | $Nb_2O_5$ | 20 | 250 | 0 | 10 | ◉ |
| Sample 7 | $Nb_2O_5$ | 10 | 250 | 0 | 9 | ◉ |
| Sample 8 | $Nb_2O_5$ | 5 | 250 | 0 | 9 | ◉ |
| (Comparative Example) | | | | | | |
| Comparative Sample 2 | $Nb_2O_5$ | 1 | 250 | 77 | 25 | X |

COMPARATIVE EXAMPLE 2

The same procedure as in Example 1 was conducted, except that a niobium oxide film was formed as a primer layer in a different thickness. Thus, Comparative Sample 2 was produced. The evaluation results for the film are shown in Table 2 above. Table 2 shows that formation of the primer layer in a thickness not smaller than 5 nm results in a reduced residual triolein amount and satisfactory antifouling properties. These results in combination with the results for Sample 1 show that the residual triolein amount was not influenced by the thickness of the primer layer in the range of from 5 to 25 nm, and that the primer layer almost fully produced its effect when it had a thickness as small as 5 nm. Practically, the thickness thereof may be 3 nm. In contrast, when the primer layer thickness was 1 nm or smaller, the primer layer was ineffective in improving the activity of the photocatalyst film as in Comparative Sample 2.

EXAMPLE 3

The same procedure as in Example 1 was conducted, except that the temperature of the glass plate in the formation of a 50-nm niobium oxide film as a primer layer and a 250-nm titanium oxide film as a photocatalyst film in a multilayer constitution was changed. Thus, Samples 9 to 12 were produced. The evaluation results obtained are shown in Table 3.

TABLE 3

| Sample No. | Glass temperature in photocatalyst film formation (° C.) | Triolein-decomposing activity (residual amount, %) | Contact angle with water (degree) | Anti-fouling performance |
|---|---|---|---|---|
| (Example) | | | | |
| Sample 9 | 300 | 0 | 10 | ◎ |
| Sample 10 | 250 | 4 | 11 | ◎ |
| Sample 11 | 150 | 12 | 12 | ○ |
| Sample 12 | No heating | 34 | 15 | ○ |

Table 3 shows that by forming the primer layer, photocatalytic activity can be obtained without heating the glass plate. This means that even in the case of using a substrate made of an organic resin having relatively poor thermal resistance, photocatalytic activity can be imparted to a surface of the substrate without deteriorating the substrate. Samples 9 to 12 each showed an X-ray diffraction peak attributable to anatase crystals, although they varied in peak intensity.

EXAMPLE 4

The same procedure as in Example 1 was conducted, except that the thickness of the photocatalyst film was changed. Thus, Samples 13 to 16 were produced. The evaluation results obtained are shown in Table 4.

COMPARATIVE EXAMPLE 3

The same procedure as in Example 1 was conducted, except that the thickness of the photocatalyst film was changed. Thus, Comparative Sample 3 was produced. The evaluation results obtained are shown in Table 4.

TABLE 4

| Sample No. | Multilayer structure Primer layer Ingredient | Multilayer structure Primer layer Thickness (nm) | Titanium oxide photocatalyst film, Thickness (nm) | Triolein-decomposing activity (residual amount, %) | Contact angle with water (degree) | Anti-fouling performance |
|---|---|---|---|---|---|---|
| (Example) | | | | | | |
| Sample 13 | Nb$_2$O$_5$ | 50 | 200 | 0 | 9 | ◎ |
| Sample 14 | Nb$_2$O$_5$ | 50 | 150 | 8 | 11 | ◎ |
| Sample 15 | Nb$_2$O$_5$ | 50 | 50 | 17 | 13 | ○ |
| Sample 16 (Comparative Example) | Nb$_2$O$_5$ | 50 | 30 | 36 | 15 | ○ |
| Comparative Sample 3 | Nb$_2$O$_5$ | 50 | 15 | 87 | 24 | X |

Table 4 shows that the thickness of the photocatalyst film is preferably 30 nm or larger, more preferably 50 nm or larger. On the other hand, when the thickness thereof was 15 nm, almost no photocatalytic function was obtained.

EXAMPLE 5

An SiO$_2$ film having a thickness of 20 nm was formed as an alkali dissolution preventive film by high-frequency sputtering using quartz glass as a target. Thereafter, a primer layer and a photocatalyst film were formed successively on the alkali dissolution preventive film in the same manner as in Example 1. Thus, Sample 17 was produced. Furthermore, Sample 18 was produced by forming a hydrophilic film of SiO$_2$ having a thickness of 10 nm on the photocatalyst film. The test results for these films are shown in Table 5. Sample 18 had improved surface hydrophilicity although slightly reduced in photocatalytic activity as determined through the triolein decomposition test. Sample 17, which had an alkali dissolution preventive film, was almost equal to Sample 1 in triolein-decomposing activity and contact angle with water (hydrophilicity).

TABLE 5

| Sample No. | Alkali dissolution preventive film | Primer layer | Photo-catalyst film | Hydro-philic film | Triolein-decomposing activity (residual amount, %) | Contact angle with water (degree) | Anti-fouling performance |
|---|---|---|---|---|---|---|---|
| (Example) | | | | | | | |
| Sample 17 | $SiO_2$ (20) | $Nb_2O_5$ (50) | $TiO_2$ (250) | | 0 | 9 | ◎ |
| Sample 18 | $SiO_2$ (20) | $Nb_2O_5$ (50) | $TiO_2$ (250) | $SiO_2$ (10) | 14 | 7 | ◎ |

Note 1: The numeral in each parenthesis indicates thickness (nm).

EXAMPLE 6

A tin oxide film having a thickness of 600 nm was formed as a primer layer on a heated glass plate having a soda-lime silicate composition by CVD (chemical vapor deposition) using dibutyltin dichloride as a starting material. On this coating film was formed a titanium oxide photocatalyst film having a thickness of 60 nm by the sol-gel method using a coating liquid containing titanium tetraisopropoxide. Thus, Sample 19 was produced. The coating liquid was prepared by chelating 0.032 mol of titanium tetraisopropoxide with 0.064 mol of acetylacetate and adding 93 ml of ethanol and 0.004 mol of acetic acid to the chelate. The titanium oxide film was formed by dipping the glass plate in this coating liquid, pulling up the glass plate (pulling rate, 9.0 mm/sec), and then burning the coating at 500° C. for 30 minutes. The photocatalytic activity of sample 19 was evaluated through various oxidation reactions and reduction reactions. The results obtained are shown in Table 6. The thus-obtained titanium oxide film of Sample 19 contained anatase crystals, and the diffraction peak intensity for the (101) plane of the anatase crystals was 12.6, which was on almost the same level as that in Comparative Sample 4 (13.2).

TABLE 6

| | Sample 19 | Comparative Sample 4 |
|---|---|---|
| 1) Rate of oxidative photodecomposition of formic acid ($10^{-6}$ mol/hr) | 4.1 | 1.3 |
| 2) Rate of oxidative photodecomposition of 1,3,5,7-tetramethylcyclotetrasiloxane monomolecular film (degree/min) | 1.7 | 0.6 |
| 3) Degree of oxidative decomposition of oleic acid (%) (light irradiation: 168 hours) | 70.6 | 34.7 |
| 4) Rate of oxidative decomposition of acetaldehyde (ppm/hr) | 43.4 | 29.2 |
| 5) Rate of silver precipitation through photoreduction ($10^{-7}$ mol/hr) | 0.83 | 1.4 |
| 6) Rate of photoreduction of bis(2-dipyridyl) disulfide to 2-mercaptopyridine ($10^{-4}$ mol/hr) | 0.71 | 1.1 |
| 7) Crystals of titanium oxide film | Anatase | Anatase |
| 8) Intensity for (101) plane of anatase crystals (arbitrary unit) | 12.6 | 13.2 ± 0.6 |

COMPARATIVE EXAMPLE 4

The same procedure as in Example 6 was conducted, except that the tin oxide primer layer was omitted and the glass plate was replaced with a quartz glass plate. Thus, Comparative Sample 4 was produced, which consisted of the quartz glass plate and a titanium oxide photocatalyst film deposited thereon. The test results for the film obtained are shown in Table 6. The titanium oxide film of Comparative Sample 4 obtained also contained anatase crystals and had slightly satisfactory crystallinity. The film was thought to be partly amorphous and partly crystalline.

The photocatalyst film of Sample 19, which had a primer layer, showed higher rates of oxidation reactions 1) to 4) than the photocatalyst film of Comparative Sample 4 but had lower rates of reduction reactions 5) and 6) than the comparative film. For enhancing the property of preventing the fouling caused by adherent organic substances, etc., it is important to heighten the rates of oxidative decomposition reactions. From this standpoint, the photocatalyst film of Sample 19 according to the invention was found to have excellent antifouling properties.

EXAMPLE 7

A soda-lime silicate glass plate was coated by the sol-gel method with a three-layer coating composed of a silicon dioxide film as an alkali dissolution preventive film, a tin dioxide film as a primer layer, and a titanium oxide film as a photocatalyst film. Thus, Sample 20 was produced. The photocatalyst film obtained was tested for catalytic activity in the oxidative decomposition reaction of Acid Blue 9. The results obtained are shown in Table 7.

Sample 21 was further produced by coating a soda-lime silicate glass plate by the sol-gel method with a three-layer coating composed of a silicon dioxide film as an alkali dissolution preventive film, a zirconium oxide film as a primer layer, and a titanium oxide film as a photocatalyst film. This photocatalyst film was examined in the same manner, and the test results obtained are shown in Table 7. Details of the procedure of Sample 20 production are as follows.

The silicon dioxide film was formed by preparing a coating fluid using tetraethoxysilane as a starting material, applying the coating fluid by spin coating (1,500 rpm), predrying the coating at 320° C. for 5 minutes, and then burning it at 500° C. for 1 hour.

The tin oxide film was formed by adding 1.59 g of acetylacetone and 25.62 g of ethyl Cellosolve to 2.79 g of stannic chloride hydrate to prepare a coating liquid, applying the coating fluid by spin coating (1,500 rpm), and drying the coating at 320° C. for 5 minutes.

The titanium oxide film was formed by adding 7.53 g of acetylacetone and 41.79 g of ethyl Cellosolve to 10.68 g of titanium isopropoxide to prepare a coating fluid, applying the coating liquid by spin coating on the surface of the tin oxide film which had been dried at 320° C., predrying the coating at 320° C. for 5 minutes, and then burning it at 620° C. for 6 minutes.

The alkali dissolution preventive film and titanium oxide film of Sample 21 were deposited in the same manners as for Sample 20.

The zirconium oxide film was formed by adding 5.07 g of ethyl acetoacetate and 47.46 g of ethyl Cellosolve to 7.47 g of zirconium tetrabutoxide to prepare a coating liquid and drying the applied coating liquid at 320° C. for 5 minutes.

For evaluating catalytic activity in an oxidation reaction thought to contribute to fouling prevention, a test liquid was used which had been prepared by dispersing Acid Blue 9, an organic pigment, into poly(vinyl alcohol). This test liquid was applied on the surface of the photocatalyst film by spin coating and then irradiated with black light at 3 mW/cm$^2$ for 10 minutes. From the difference between the absorbance before the irradiation and that after it, the rate of oxidative decomposition of Acid Blue 9 was determined.

COMPARATIVE EXAMPLE 5

The same procedure as for Sample 20 in Example 7 was conducted, except that the primer layer was omitted. Thus, Comparative Sample 5 was produced. The film obtained was tested in the same manner as in Example 7, and the results obtained are shown in Table 7. The samples shown in Table 7, when analyzed by the X-ray diffraction method, each showed a peak attributable to anatase crystals. In each of these X-ray diffraction patterns, the peak attributable to anatase crystals was broad, indicating that the crystallization was incomplete. No difference was observed among these samples.

TABLE 7

| Sample | Alkali dissolution preventive film | Primer layer | Photo-catalyst film | Rate of decomposition of Acid Blue 9 (relative value) |
|---|---|---|---|---|
| (Example) | | | | |
| Sample 20 | $SiO_2$ (100) | $SnO_2$ (60) | $TiO_2$ (90) | 7.06 |
| Sample 21 | $SiO_2$ (100) | $ZrO_2$ (60) | $TiO_2$ (90) | 7.42 |
| (Comparative Example) | | | | |
| Comparative Sample 5 | $SiO_2$ (100) | — | $TiO_2$ (90) | 4.11 |

Note 1: The numeral in each parenthesis indicates thickness (nm).
Note 2: Each relative value is based on the decomposition rate for comparative sample 6 in Table 8, which was taken as 1.00.

Table 7 shows that the decomposition rate was increased by forming a primer layer. Namely, it was found that photocatalytic activity is improved by interposing a primer layer between the glass plate and the photocatalyst film.

EXAMPLE 8

A silicon dioxide film as an alkali dissolution preventive film was formed on a soda-lime silicate glass plate by the sol-gel method. On this film was formed a tin oxide film as a primer layer by the sol-gel method. A film consisting of silicon dioxide as a matrix and fine titanium oxide particles dispersed therein was further formed as a photocatalyst film on the primer layer by the sol-gel method. Thus, Sample 22 was produced, which had a three-layer coating.

Sample 23 having a three-layer coating was produced in the same manner as for sample 22, except that the primer layer was replaced with a zirconium oxide film.

Furthermore, Sample 24 having a three-layer coating was produced in the same manner as for Sample 22, except that the primer layer was replaced with a niobium oxide film.

The silicon oxide film, tin oxide film, and zirconium oxide film were deposited by the same methods as in Example 7. The niobium oxide film was formed by applying coating fluid GIP-Nb04-1 (trade name), manufactured by Giken Kagaku K. K., by spin coating and drying the coating at 320° C. for 5 minutes The photocatalyst film was deposited by mixing 6 g of coating fluid ST-K03 (trade name) for photocatalyst deposition (containing $SiO_2$ and $TiO_2$ in a ratio of 50:50 by weight), manufactured by Ishihara Sangyo Kaisha, Ltd., with 9 g of ethyl Cellosolve, applying the diluted coating fluid by spin coating, preburning the coating at 320° C. for 5 minutes, and then burning it at 620° C. for 6 minutes.

COMPARATIVE EXAMPLE 6

The same procedure as for Sample 22 in Example 8 was conducted, except that the primer layer was omitted. Thus, Comparative Sample 6 was produced, which had a two-layer coating. The test results for the film obtained are shown in Table 8. The samples shown in Table 8, when analyzed by the X-ray diffraction method, each showed a distinct diffraction peak attributable to anatase crystals.

TABLE 8

| Sample | Alkali dissolution preventive film | Primer layer | Photocatalyst film | Rate of decomposition of Acid Blue 9 (relative value) |
|---|---|---|---|---|
| (Example) | | | | |
| Sample 22 | $SiO_2$ (100) | $SnO_2$ (60) | $SiO_2$ containing dispersed $TiO_2$ particles (120) | 7.67 |
| Sample 23 | $SiO_2$ (100) | $ZrO_2$ (60) | $SiO_2$ containing dispersed $TiO_2$ particles (120) | 1.55 |
| Sample 24 | $SiO_2$ (100) | $Nb_2O_5$ (60) | $SiO_2$ containing dispersed $TiO_2$ particles (120) | 2.75 |
| (Comparative Example) | | | | |
| Comparative Sample 6 | $SiO_2$ (100) | — | $SiO_2$ containing dispersed $TiO_2$ particles (120) | 1.00 |

Note 1: The numeral in each parenthesis indicates thickness (nm).
Note 2: Each relative value is based on the decomposition rate for comparative sample 6, which was taken as 1.00.

Table 8 shows that use of a thin, transparent silicon dioxide film containing fine titanium oxide particles dispersed therein as a photocatalyst film was also effective in improving photocatalytic activity.

The article of the present invention has a multilayer structure which comprises a substrate, a first n-type semiconductor film as a primer layer formed over a surface of the substrate, and a photocatalyst film made of an n-type semiconductor and formed on the primer layer, and in which the first n-type semiconductor film as the primer layer has a larger energy band gap than the photocatalyst film. Due to this constitution, holes are apt to move to areas near the surface of the photocatalyst film, whereby electron/hole recombination within the photocatalyst film is inhibited.

Since electrons and holes are thus inhibited from recombining and thereby coming not to contribute to photocatalytic activity, the article has photocatalytic functions effectively imparted thereto.

When an oxide semiconductor film comprising titanium oxide is used as the photocatalyst film and an oxide semiconductor film comprising at least one metal oxide selected from the group consisting of niobium oxide, tin oxide, aluminum oxide, zinc oxide and zirconium oxide is used as the primer layer, then photocatalytic activity can be effectively imparted to the article.

When the thickness of the primer layer and that of the photocatalyst film are regulated to 5 nm or larger and to from 30 to 2,000 nm, respectively, then photocatalytic activity can be effectively imparted to the article.

Furthermore, when the substrate is a transparent silicate glass plate and the article has, interposed between the glass plate and the primer layer, an alkali diffusion preventive film serving to prevent the alkali ingredient(s) contained in the silicate glass from diffusing into the photocatalyst film, then photocatalytic activity can be effectively imparted especially in the case where the substrate is heated to a high temperature in forming the photocatalyst film.

What is claimed is:

1. An article having photocatalytic activity which comprises a substrate, a first n-type semiconductor film as a primer layer formed over a surface of the substrate, and a photocatalyst film made of an n-type semiconductor and formed on the primer layer, said first n-type semiconductor film as the primer layer (i) having an energy band gap larger than that of said photocatalyst film and (ii) being an oxide semiconductor film consisting of at least one metal oxide selected from the group consisting of niobium oxide and zirconium oxide.

2. The article having photocatalytic activity as claimed in claim 1, wherein the photocatalyst film is an oxide semiconductor film comprising titanium oxide.

3. The article having photocatalytic activity as claimed in claim 1, wherein the primer layer has a thickness of 5 nm or larger.

4. The article having photocatalytic activity as claimed in claim 1, wherein the photocatalyst film has a thickness of 30 to 2,000 nm.

5. The article having photocatalytic activity as claimed in claim 1, wherein the substrate is a transparent glass plate.

6. The article having photocatalytic activity as claimed in claim 1, which has a hydrophilic film formed on the surface of the photocatalyst film.

7. An article having photocatalytic activity which comprises a substrate, a first n-type semiconductor film as a primer layer formed over a surface of the substrate, and a photocatalyst film made of an n-type semiconductor and formed on the primer layer, said first n-type semiconductor film as the primer layer (i) having an energy band gap larger than that of said photocatalyst film and (ii) being an oxide semiconductor film consisting of at least one metal oxide selected from the group consisting of niobium oxide and zirconium oxide, wherein the substrate is a glass transparent plate, and said article having, interposed between the glass plate and the primer layer, an alkali diffusion preventive film which serves to prevent any alkali ingredient contained in the glass from diffusing into the photocatalyst film.

8. The article having photocatalytic activity as claimed in claim 7, which has a hydrophilic film formed on the surface of the photocatalyst film.

9. An article having photocatalytic activity which comprises a substrate, a first n-type semiconductor film as a primer layer formed over a surface of the substrate, and a photocatalyst film made of an n-type semiconductor and formed on the primer layer, said first n-type semiconductor film as the primer layer (i) having an energy band gap larger than that of said photocatalyst film and (ii) being an oxide semiconductor film consisting of niobium oxide or niobium oxide and zirconium oxide.

* * * * *